Patented Feb. 10, 1931

1,791,568

UNITED STATES PATENT OFFICE

ALWIN MITTASCH, OF LUDWIGSHAFEN-ON-THE-RHINE, MATHIAS PIER, OF HEIDELBERG, AND CARL MÜLLER, OF MANNHEIM, GERMANY, ASSIGNORS TO I. G. FARBENINDUSTRIE AKTIENGESELLSCHAFT, OF FRANKFORT-ON-THE-MAIN, GERMANY

MANUFACTURE OF OXYGENATED ORGANIC COMPOUNDS

No Drawing. Application filed September 15, 1923, Serial No. 662,960, and in Germany February 22, 1923.

As is known carbon monoxid or dioxid or mixtures of both can be reduced by means of hydrogen or hydrocarbons rich in hydrogen at increased pressure and temperature and under the action of certain catalysts to form liquid hydrocarbons and, ordinarily, certain amounts of oxygenated organic products such as alcohols, aldehydes, acids and the like.

We have now found that the valuable oxygenated compounds, in particular methanol, which heretofore could only be obtained by charring wood, can be produced with good yields as the sole or chief products, by the reduction of carbon monoxid, or dioxid, provided gas mixtures be employed, on the one hand, containing hydrogen or hydrocarbons in quantities exceeding those of the carbon oxids, i. e. more than one volume of the former to each one volume of the latter, preferably in quantities exceeding those calculated according to the formulæ:

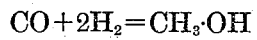

and

and employing at the same time, on the other hand, contact masses containing metal oxids non-reducible under the conditions of working or compounds thereof. The non-reducible oxids may be employed alone or mixed or compounded together or with other substances, either inert or acting catalytically, such as easily reducible metallic oxids or the corresponding metals or with metals of the non-reducible oxids. As instances of catalysts for the purpose of this invention we mention the oxids, hydroxids or carbonates of the alkali, earth alkali, or earth metals, or mixtures or compounds of magnesia, alumina and the like with the oxids of lead, bismuth, thallium, zinc, cadmium, copper, tin, antimony, silicon, boron, titanium. Metals of the iron group, however, especially iron, nickel, cobalt, should be present, if at all, only in small amounts or in conjunction with other metals, as they may lead to the formation of methane or other hydrocarbons. We direct attention to the application of Mittasch and Pier, Serial No. 735,823, Patent No. 1,569,775 in which the exclusion of iron has been broadly claimed.

The catalysts may be put in the reaction vessel without any previous further treatment. As a rule they will be used in the shape of grains or lumps and if mixed catalysts are employed intimate mixtures may be prepared in any suitable manner, for example by simultaneous precipitation or fusion, or by intimately stirring one of the components with the solution, or melt, of the other, and supports, such as asbestos may also be employed.

The gas mixture serving for the reaction, should contain a high excess of hydrogen (or hydrocarbon) for example one time and a half the calculated quantity by the above formulæ or a multiple thereof, and, it may also be purified and dried prior to the reaction. For example, suitable proportions of gases for employment according to the process of the present invention are between about 70 and 90 per cent by volume of hydrogen and between about 25 and 10 per cent by volume of carbon monoxide.

The desired reaction may, for example, be carried out at temperatures of about 200° C. or above and will ordinarily be carried out between about 300 degrees and 600 degrees centigrade, but in case of singularly active masses even temperatures below 300 degrees may be used. The pressure will preferably be kept above 50 atmospheres and may be raised to any desired degree. In general, pressure and temperature should be adapted to the kind of the contact mass actually used; in certain cases very high pressures and/or relatively high temperatures will be recommended. The operation can be carried out in a circulatory system and with recovery of the heat, by which means the supply of heat can be restricted or even be dispensed with. The original composition of the circulating pure gas is maintained by proper addition of fresh gases. If desired, the process can be carried out without circulating, for example by employing several apparatus in series, or by using a single apparatus with a hot part, containing the catalyst, and a cold part without catalyst, in which cold part the liquid reaction products condense.

The separation of the methanol and other liquid compounds is best effected without releasing the pressure by cooling, which may be assisted by using arrangements furthering the condensation such for instance as towers filled with Raschig rings or other bodies, and the like, or washing with water or other suitable liquids may be employed.

The following examples will serve to further illustrate our invention and the manner in which it may be carried into effect, but we do not wish to limit ourselves to these examples as the catalysts, gas mixtures, temperature, pressure and other conditions may be varied without departing from the scope of the invention.

*Example 1*

A mixture of 3 parts, by volume, of hydrogen and 1 part, by volume, of carbon monoxid is passed, at a pressure between about 500 and 1000 atmospheres and at about 550 degrees centigrade over a catalyst consisting of potash-lime or of a mixture of equal parts of caustic potash and alumina. When the gas mixture, after the treatment, is cooled under pressure, a liquid condenses which consists of methyl alcohol, which may be mixed with other alcohols and sometimes a little water, but no substantial amount of substances of an oily nature. The remaining gas may be used again directly or after suitable replenishment, for instance, it may be passed through another reaction vessel containing a catalyst. The proportions of the gas mixture may be different, though the hydrogen should, in any event, exceed the carbon monoxid. Instead of, or in addition to carbon monoxid, carbon dioxid may be used, and besides hydrogen, a hydrocarbon rich in hydrogen, such as methane, may be present. Inert gases, for example nitrogen, may also be present.

*Example 2*

A gas mixture composed of about 22 per cent, by volume, of carbon monoxid, 3 per cent of carbon dioxid, 71 per cent of hydrogen and 4 per cent of nitrogen is conveyed at about 180 atmospheres and 520 degrees centigrade over magnesium chromate; on cooling the reaction gas under pressure, alcohols, chiefly methanol condense in ample amounts. A granulated mixture of lead chromate with alumina, to which a little caustic potash may be added is also suitable as a catalyst.

*Example 3*

A gas mixture, dry and purified, consisting, by volume, of about 20 per cent of carbon monoxid, 3 per cent of carbon dioxid, 4 per cent of methane and ethane, 70 per cent of hydrogen and 3 per cent of nitrogen is passed, at a pressure of 800 atmospheres and at a temperature between 350 degrees and 400 degrees centigrade, over a catalyst consisting of magnesium, or zinc oxid and potassium, or rubidium hydroxid, or carbonate. The liquid reaction product consists chiefly of methanol.

*Example 4*

Copper oxid is intimately mixed with powdered aluminium and the mass is ignited in the air, or in an atmosphere of an inert gas. An intimate mixture of copper and alumina results which on passing over it a mixture of 9 parts, by volume, of hydrogen and 1 part, by volume, of carbon monoxid, gives rise to excellent yields of methanol.

Mixtures of potassium, cæsium or rubidium, compounds with oxids of, for example, uranium, aluminium, chromium, manganese, or with rare earth metal oxids, such as cerium, lanthanum, thorium, zirconium, or yttrium oxids may also be used, or mixtures, or compounds of zinc oxid with alumina, barium oxid, rare earths, or with oxids of chromium, copper, magnesium, molybdenum, manganese, tantalum, titanium, tungsten, or zinc oxid with vanadic acid, or antimony oxid with glucinium oxid, or tungsten, threads containing thoria or metallic molybdenum, or thallium containing alumina may be employed.

A very efficient catalyst is obtained by melting 300 parts by weight of potassium dichromate and introducing, while stirring 100 parts of zinc oxid which proportions may be varied. On continuing heating, the mass becomes stiff and is then poured on a metal sheet and broken, when cool. It may be put into the contact furnace either directly or after leaching out the alkali salt with water, or after a reduction. Instead of zinc oxid, oxids of other metals, for example manganese, thallium, cerium, uranium, thorium, zirconium, or mixtures of them may be introduced into the melt of potassium dichromate.

Carl Muller took no part in inventing the feature of excluding iron and nickel from the catalyst. That feature of the invention was made by Mittasch and Pier, the patentees in U. S. Patent 1,569,775 and two of the patentees in Patent 1,558,559, and such feature was invented by said patentees before the invention set forth in the present application was made.

We claim:

1. In the process of manufacturing methanol by the interaction of hydrogen and a mixture of the oxids of carbon in the presence of a catalyst capable of causing the formation of methanol by said interaction, the step of employing more than two volumes of hydrogen for each volume of carbon monoxide and more than three volumes of hydrogen for each volume of carbon dioxide.

2. In the process of manufacturing methanol by the interaction of hydrogen and carbon monoxid in the presence of a catalyst capable of causing the formation of methanol by said interaction, the step of employing a gas mixture containing at least 70 parts, by volume, of hydrogen, for 25 parts, by volume, of carbon monoxid.

3. In the process of manufacturing methanol by the interaction of hydrogen and carbon monoxid in the presence of a catalyst capable of causing the formation of methanol by said interaction, the step of employing a gas mixture containing between 70 and 90 per cent, by volume, of hydrogen and between 25 and 10 per cent, by volume, of carbon monoxid.

4. In the process of manufacturing methanol by the interaction of hydrogen and carbon monoxid in the presence of a catalyst capable of causing the formation of methanol by said interaction, the step of employing a gas mixture containing at least 70 parts, by volume, of hydrogen, for 25 parts, by volume, of carbon monoxid and passing this gas over a catalyst containing a metal oxid non-reducible under the conditions of working.

5. In the process of manufacturing methanol by the interaction of hydrogen and carbon monoxid in the presence of a catalyst capable of causing the formation of methanol by said interaction, the step of employing a gas mixture containing at least 70 parts, by volume, of hydrogen, for 25 parts, by volume, of carbon monoxid and passing this gas over a catalyst containing several metal oxids non-reducible under the conditions of working.

6. The process of producing oxygenated organic compounds by hydrogenating carbon oxides under a pressure of not less than approximately 50 atmospheres and at a temperature not lower than 200° C., which comprises passing a mixture comprising more than two volumes of hydrogen for each volume of carbon monoxide and more than three volumes of hydrogen for each volume of carbon dioxide over a catalyst capable of causing the formation of methanol by said interaction.

7. The process of producing oxygenated organic compounds by hydrogenating carbon oxides under a pressure of not less than approximately 50 atmospheres and at a temperature not lower than 200° C., which comprises passing a mixture comprising more than two volumes of hydrogen for each volume of carbon monoxide and more than three volumes of hydrogen for each volume of carbon dioxide over a catalyst containing a metal oxide non-reducible under the conditions of working.

8. In the process of manufacturing methanol by the interaction of hydrogen and an oxid of carbon in the presence of a catalyst capable of causing the formation of methanol by said interaction, the step of employing an amount of hydrogen at least one and one-half times the amount calculated in respect of the oxid of carbon.

9. In the process of manufacturing methanol by the interaction of hydrogen and carbon monoxide in the presence of a catalyst capable of causing the formation of methanol by said interaction, the step of employing an amount of hydrogen at least one and one-half times the volume of hydrogen calculated in respect of the carbon monoxide.

10. The process of producing oxygenated organic compounds by hydrogenating carbon oxids under a pressure not less than approximately 50 atmospheres and at a temperature not lower than 200 degrees centigrade, which comprises passing a mixture of a carbon oxid with hydrogen, the hydrogen being present in an amount of at least one and one-half times the volume theoretically required, over a catalyst capable of causing the formation of methanol by said interaction.

11. The process of producing oxygenated organic compounds by hydrogenating carbon oxids under a pressure not less than approximately 50 atmospheres and at a temperature not lower than 200 degrees centigrade, which comprises passing a mixture of a carbon oxid with hydrogen, the hydrogen being present in an amount of at least one and one-half times the volume theoretically required, over a catalyst containing zinc.

12. In the process of manufacturing methanol by the interaction of hydrogen and carbon dioxide in the presence of a catalyst capable of causing the formation of methanol by said interaction, the step of employing an amount of hydrogen at least one and one-half times the volume calculated in respect of the carbon dioxide.

13. In the process of manufacturing methanol by the interaction of hydrogen and carbon dioxide in the presence of a catalyst capable of causing the formation of methanol by said interaction, at a temperature between 200 and 600 degrees centigrade and under a pressure in excess of 50 atmospheres, the step of employing an amount of hydrogen at least one and one-half times the amount theoretically required.

In testimony whereof we have hereunto set our hands.

ALWIN MITTASCH.
MATHIAS PIER.
CARL MÜLLER.